(12) United States Patent
Mubuifor

(10) Patent No.: US 8,814,177 B1
(45) Date of Patent: Aug. 26, 2014

(54) MOTORIZED GENERATOR—POWERED ELECTRIC CAR

(71) Applicant: Linus N. Mubuifor, Las Vegas, NV (US)

(72) Inventor: Linus N. Mubuifor, Las Vegas, NV (US)

( * ) Notice: Subject to any disclaimer, the term of this patent is extended or adjusted under 35 U.S.C. 154(b) by 0 days.

(21) Appl. No.: 13/718,347

(22) Filed: Dec. 18, 2012

Related U.S. Application Data

(60) Provisional application No. 61/664,110, filed on Jun. 25, 2012.

(51) Int. Cl.
*B60K 6/42* (2007.10)

(52) U.S. Cl.
USPC .................. 280/5.514; 280/6.157; 180/65.22

(58) Field of Classification Search
USPC ................. 280/5.514, 5.506, 6.157; 180/68.3
See application file for complete search history.

(56) References Cited

U.S. PATENT DOCUMENTS

| | | | | |
|---|---|---|---|---|
| 2004/0231900 A1* | 11/2004 | Tanaka et al. | ................ | 180/68.3 |
| 2005/0228553 A1* | 10/2005 | Tryon | ............................. | 701/22 |

\* cited by examiner

*Primary Examiner* — Jeffrey J Restifo
*Assistant Examiner* — Erez Gurari
(74) *Attorney, Agent, or Firm* — John C. Lambertsen; Kenehan & Lambertsen, Ltd.

(57) ABSTRACT

A motorized-generator power system utilizes a constant-speed internal combustion engine to operate an electric generator. Electrical power from the generator operates an electric vehicle drive motor as well as charging a battery power pack. A drive motor controller provides control over the rotational speed of the drive motor and stored electrical energy in the battery power pack may be used to power the vehicle drive motor when the internal combustion engine is shut down. A suspension system is also provided to raise and lower the vehicle for clearance and flood-avoidance requirements.

1 Claim, 3 Drawing Sheets

MOTORIZED GENERATOR—POWERED ELECTRIC CAR

RELATED APPLICATIONS

The present application claims priority under 35 U.S.C. §119(e) to U.S. Provisional Patent Application Ser. No. 61/664,110, filed Jun. 25, 2012, which is incorporated by reference herein for all that it contains.

BACKGROUND OF THE INVENTION

1. Field of the Invention

The present invention relates to motorized vehicles, and more specifically, to vehicles powered by electric motors. More specifically, the present invention relates to a motorized vehicle utilizing an electric motor that relies upon electrical energy of a generator powered by the internal combustion engine or through the discharge of storage batteries charged by that generator.

2. Description of the Related Art

Motor vehicles consume fuel on an operating/time basis. Since most are utilized for travel, miles per gallon is frequently calculated to determine engine efficiency; although such calculations could also be done on a gallons per time basis as well.

The growth of the Chinese and Indian economies has also resulted in a dramatic increase in the demand for fossil fuels—by some calculations this demand has tripled over the past few years. There is some concern that demand will outstrip supply, since the output in many known oil fields is falling, and supply is frequently dependent on oil fields located in areas of armed conflict.

There is also concern by some of a global warming problem due in large part to the combustion gases of fossil fuels. Such warming is viewed as a threat to the environment now, as well as for future generations. A need exists to reduce the present consumption levels of fossil fuels, while simultaneously seeking alternative sources of energy.

SUMMARY OF THE INVENTION

As discussed previously, fuel consumption relates both to distance traveled as well as the period of time of engine operation—for example so many gallons of fuel per hour of engine operation. In accordance with the present invention by eliminating the distance variable a large savings of energy can be obtained. For example, if a motor of a certain horsepower burns fuel at the rate of 1 gallon of fuel per hour, 5 gallons of fuel will be burned regardless of whether 5 hours brought you 5 miles or 500 miles.

In a further aspect of the present invention a motorized-generator power system, comprising: a constant-speed internal combustion engine operatively connected to a rotating drive shaft; an electric generator in rotative communication with said rotating drive shaft, wherein rotation of said rotating drive shaft results in the generation of electrical energy by said electrical generator; a batter power pack in electrical communication with said electric generator, wherein a select amount of electrical energy generated by said electric generator charges said battery power pack; a vehicle drive motor in electrical communication with both said electric generator and said battery power pack, wherein the generation of electrical energy by said electrical generator or through the discharge of said battery power pack is communicated to said vehicle drive motor and results in the rotation of a drive shaft of said vehicle drive motor; and a drive motor controller in electrical communication with said vehicle drive motor in a manner providing selective control over rotation of said drive shaft of said vehicle drive motor.

It is to be understood that the invention is not limited in its application to the details of construction and the arrangement of components described hereinafter and illustrated in the drawing figures. Those skilled in the art will recognize that various modifications can be made without departing from the scope of the invention.

DESCRIPTION OF THE DRAWINGS

Embodiments in accordance with the present invention are described below in connection with the accompanying drawing figures.

DETAILED DESCRIPTION OF THE PREFERRED EMBODIMENTS

Figure 1:
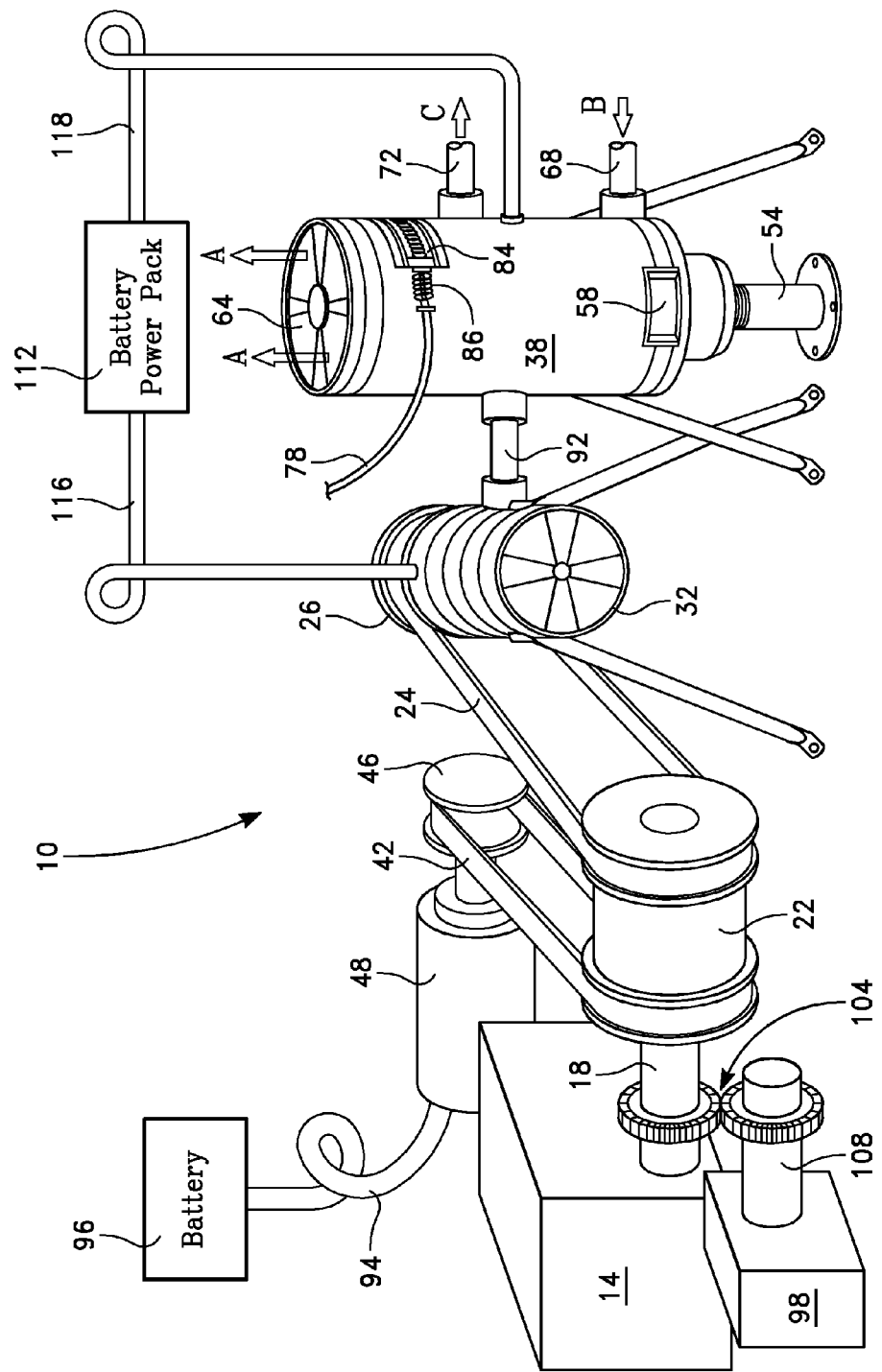
FIG. 1 is a partial perspective view of a motorized-generator power system in accordance with the present invention.

Reference is now made to the drawings wherein like structures refer to like parts throughout. In FIG. 1 a motorized-generator power system 10 includes a one-cylinder internal combustion engine 14 that is preferably sized to provide a 10-horsepower output. A rotating drive shaft 18 extends from the one-cylinder engine, terminating in a twin-belt drive pulley 22. As presently contemplated a first one of the two belts 24 is attached to a first driven pulley (not shown in FIG. 1) that in turn drives an electric generator 32 used to provide electrical energy to one or more drive motors 38. In a presently preferred embodiment only one of the drive motors 38 is provided, with power directed to each of the vehicle wheels through a transmission system (not shown in FIG. 1).

A second belt 42 is attached to a second driven pulley that in turn drives an alternator 48, which supplies electrical energy for use by various vehicle electrical systems—such as headlights, electrically-powered instruments, and the like (not shown in the Figures).

The present invention contemplates operating the one-cylinder engine 14 at substantially the same engine speed, powering the electrical generator 32 and the alternator 48, regardless of the speed at which the vehicle moves. As discussed above, vehicle movement is the result of supplying electrical power to the individual vehicle drive motors 38 that in turn drive the vehicle wheels. The fuel consumption by the one-cylinder engine is thus substantially unrelated to vehicle speed, consuming essentially the same amount of fuel whether the vehicle is at rest or moving forward at a high rate of speed.

An electric motor drive shaft 54 extends from the vehicle drive motor 38, attaching to a vehicle wheel transmission or to a vehicle wheel if direct-drive. To maintain the vehicle drive motor 38 within optimum operating temperatures two cooling systems are preferably provided. As with many electrical motors air is passed through the motor to carry off heat generated during motor operation. In FIG. 1 air enters the drive motor 38 through a cooling air intake 58. After passage through the motor the warmed air exits through a discharge opening 64 located at a substantially opposite end of the outer casing from the air intake 58. The discharge flow of cooling air from the drive motor 38 is indicated by arrows A.

The present invention also contemplates the use of a liquid coolant to assist in maintaining an optimal operating temperature for the drive motors 38. Liquid coolant is circulated within the drive motor 38, entering through a coolant intake 68, passing through one or more heat exchange jackets (not shown), and emerging through a coolant discharge 72. The warmed liquid coolant is then circulated through an external heat exchanger/radiator prior to circulation back through the electrical drive motor 38. This recirculating flow of liquid coolant through the drive motor 38 is depicted by intake arrow B and discharge arrow C.

Control of vehicle speed is provided using a control cable 78. Attached at one end to a control mechanism, such as a pedal, the control cable 78 communicates the control-inputs of the vehicle operator—to speed up or slow down the rotation of the drive motor 38 and thereby speed or slow the vehicle. The speed control cable 78 is connected to drive motor controller 84. A return spring 86 is shown attached to the motor controller 84 to spring-bias the motor controller 84 to an idle position when pressure applied by the control cable 78 is relaxed. Of course, control of the drive motor 78 can be entirely electronic and not the mechanical controller 84 depicted in FIG. 1. Additionally, whether mechanical or electronic, once the vehicle operator applies pressure to the brake pedal the electrical motor is temporarily disconnected from the transmission, with reconnection occurring once pressure is lifted from the brake pedal.

As previously discussed the electrical generator 32 obtains power from the 10-horsepower one-cylinder engine 14 through the twin belt pulley 22 and the first of two belts 24. A power supply conduit 92 preferably extends between the electrical generator 32 and the drive motor 38 to provide a more protected and secure electrical connection between the generator and the motor. The vehicle power train thus encompasses the one-cylinder engine 14, the drive pulley connection to the electrical generator 32, which in turn is electrically connected to the vehicle drive motor 38 using a safe, power supply conduit 92.

As mentioned, the alternator 48 provides electrical energy to all of the vehicle subsystems, not including the electrical drive motor(s) 38 that power the vehicle. Power for the generator 48 is delivered through the twin belt pulley 22, the second belt 42, and the second driven pulley from the 10-horsepower one-cylinder engine 14. The alternator 48 is also electrically connected thorough a pair of electrical cables 94 to a vehicle battery 96 for energy storage. In addition to powering vehicle accessories, the vehicle battery 96 is also used to provide the power to energize an electrical starter motor 98 used to start the 10-horsepower one-cylinder motor 14.

FIG. 1 illustrates one manner of connecting the electrical starter motor 98 using a pair of starter motor gears 104 to engage the drive shaft 18 of the one-cylinder engine 14 with the starter motor shaft 108. When energized the electrical starter motor 98 rotates the starter motor shaft 108 and the meshed starter motor gears 104 cause the drive shaft 18 to rotate until the one-cylinder engine 14 itself starts and begins running under its own power. The starter motor gears 104 then disengage and the electrical starter motor 98 is no longer energized.

The present invention also contemplates battery-powered vehicle motion using the vehicle battery power pack 112 that is charged by the electrical generator 32 through a charging line 116. Once the vehicle is in motion and up to speed a vehicle operator can switch on an "economy" mode that shuts off the one-cylinder engine 14 and connects the vehicle battery power pack 112 to the vehicle drive motor 38 through a power pack transmission line 118. In this mode the vehicle drive motor 38 continues to power and drive the vehicle using only stored battery power.

While in the "economy" mode once 75% of the stored energy has been consumed, the one-cylinder engine 14 automatically starts and provides electrical energy to the drive motor 38 and recharges the battery power pack 112. This power-down and re-charge cycle continues while the vehicle remains in the "economy" mode.

Figure 2:
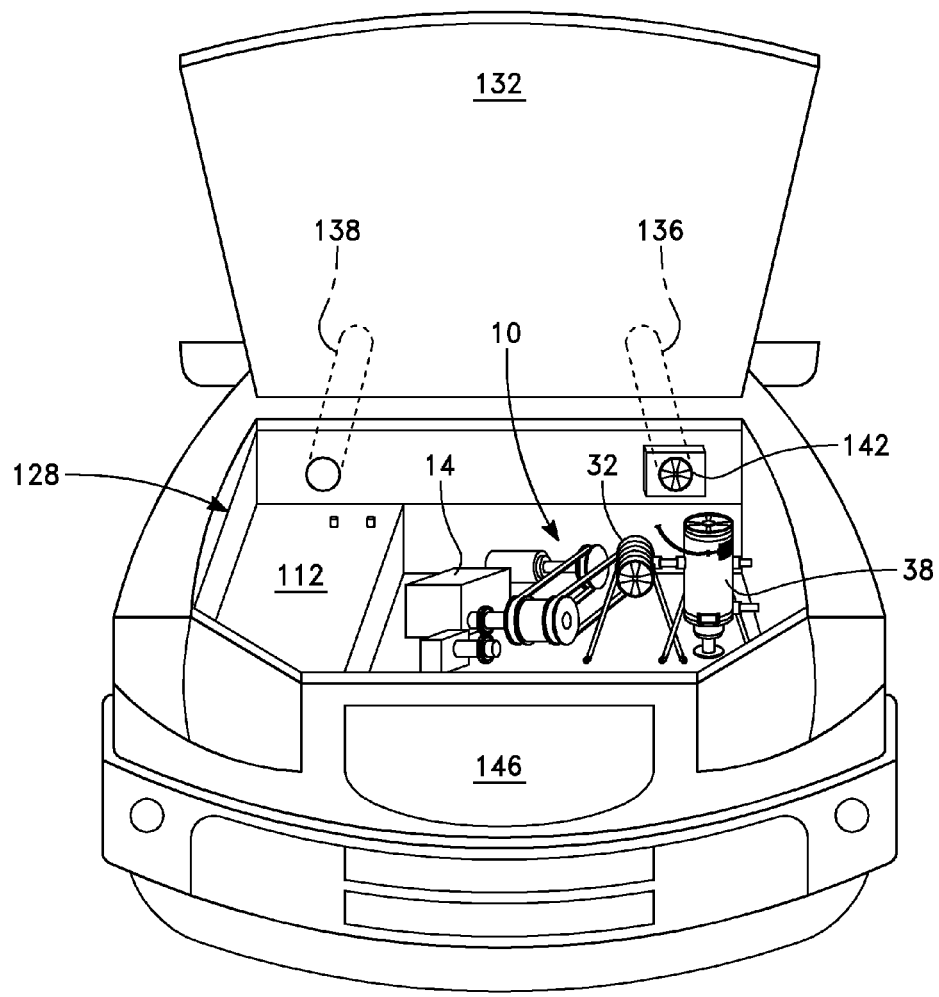
FIG. 2 is a partial perspective view, with portions shown in phantom, of the motorized-generator power system of FIG. 1 as received within an engine compartment of a motor vehicle in accordance with the present invention.

A vehicle engine compartment 128 is shown in FIG. 2 having a lockable hood 132 (shown up-raised in FIG. 2) to provide a secure compartment to protect all of the engine components shown within the engine compartment 128. An air supply passageway 136 enables the flow of outside air into the engine compartment 128, providing combustion air for the one-cylinder engine 14. An exhaust air passageway 138 is likewise provided to enable the expulsion of air from within the engine compartment 128. In a presently preferred embodiment a fan 142 is provided adjacent the interior opening of the air supply passageway 136 to enhance the flow of outside air into the engine compartment 128. A coolant radiator 146 is preferably provided in the conventional location to enhance cooling of the fluid after passage through the vehicle drive motor 38.

Although not shown in FIG. 2, a mechanical connection is provided between the vehicle drive motor 38 and the vehicle transmission (not shown) that is located outside of the engine compartment 128. Additionally, the engine compartment 128 also provides a preferred location for the battery power pack 112, placing it substantially adjacent the electrical generator 32 for charging and for powering the vehicle drive motor 38, enabling motor-off operation.

The engine compartment 128 is preferably of a two-layer construction, the outer layer made of steel and the inner layer fabricated using a high-temperature resistant plastic material. The lockable hood 132 preferably sealingly engages with the engine compartment 128. The hood 132 preferably includes a sealing gasket (not shown) fabricated out of a soft, high temperature-resistant rubber that creates a secure seal with the opening edge of the engine compartment 128. It is intended that upon closing the lockable hood 132 the engine compartment 128 is substantially sealed from the outside environment, with no air or water entry into the compartment except by passage through the engine air supply passageway 136 and the exhaust air passageway 138.

Figure 3:
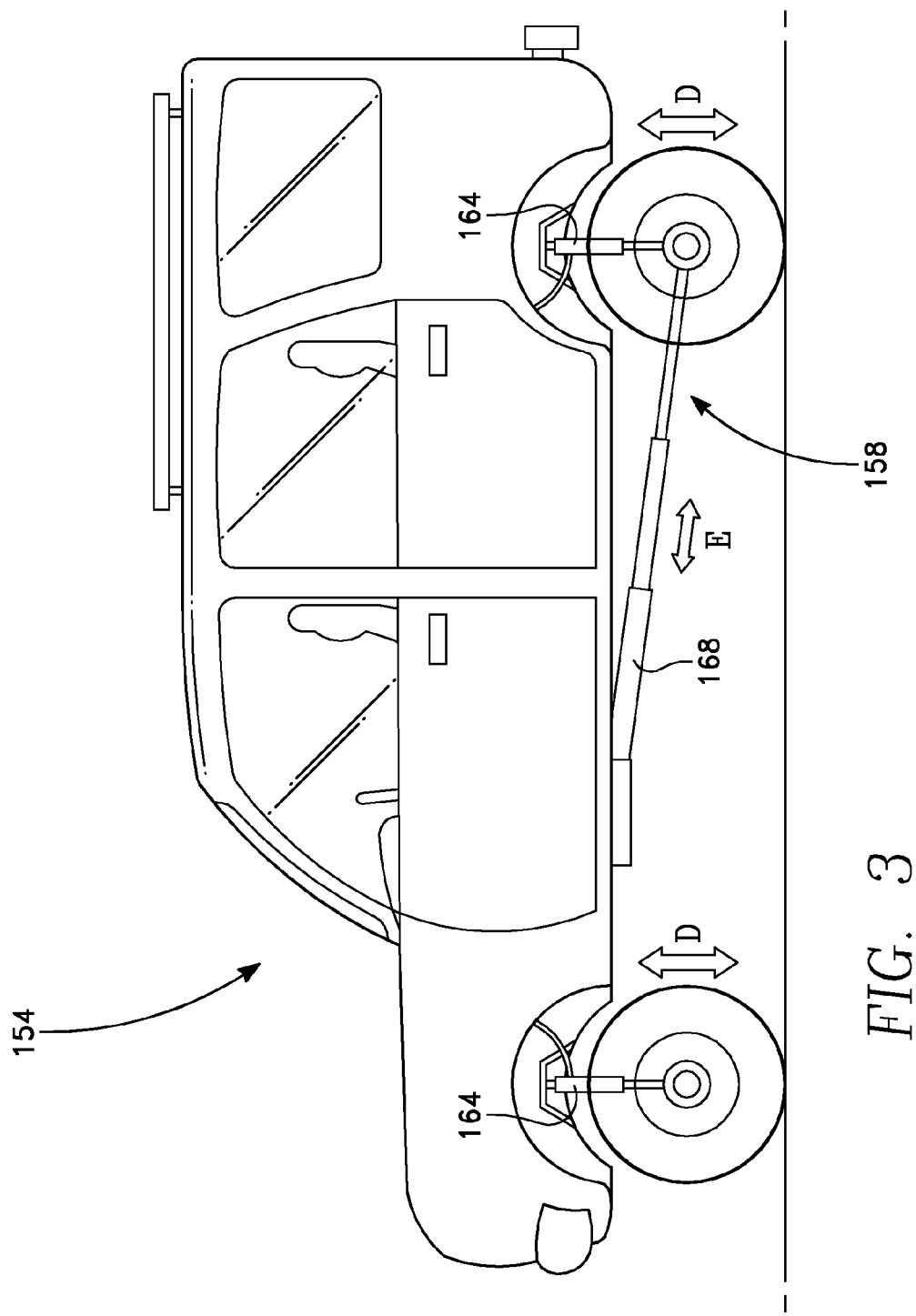
FIG. 3 is a side elevation view of a motor vehicle having a suspension system in accordance with the present invention.

The inventive power system may appropriately be installed in a sport utility vehicle ("SUV") 154 shown in FIG. 3 (note the optional inclusion of additional battery power packs 112 located adjacent the chassis frame). Also shown is a suspension system 158 consisting of hydraulics (not shown) that power wheel struts 164 to enable the raising and lowering of the vehicle 154 (depicted by Arrows D). An extendable drive shaft 168 (extending in the directions of Arrow E) is provided to enable rotation of the vehicle wheels regardless of the vertical position of the vehicle 154. An optimum operating/traveling configuration suggests that the suspension system be capable of raising the vehicle approximately 1.5 meters raised—such as might be required when operation of the vehicle is required during flooding.

The engine compartment 128 is preferably fabricated having an outer steel layer overlying an interior plastic layer having a high electrical resistance (poor electrical conductor). The various electrical components rest upon this non-conductive layer. A soft, high temperature-resistant rubber material is used at the top to connect the inner plastic layer with the outer steel layer. In a presently preferred embodiment an exhaust pipe (not shown) extends from the container and directs the flow of the exhaust gasses from the 10-horsepower motor within the container to a vehicle muffler (not shown) for discharge.

My invention has been disclosed in terms of a preferred embodiment thereof, which provides a motorized generator-powered electric car that is of great novelty and utility. Various changes, modifications, and alterations in the teachings of the present invention may be contemplated by those skilled in the art without departing from the intended spirit and scope thereof. It is intended that the present invention encompass such changes and modifications.

I claim:

1. A motorized-generator power system, comprising:
    a constant-speed internal combustion engine operatively connected to a rotating drive shaft;
    an electric generator in rotative communication with said rotating drive shaft, wherein rotation of said rotating drive shaft results in the generation of electrical energy by said electrical generator;
    a battery power pack in electrical communication with said electric generator, wherein a select amount of electrical energy generated by said electric generator charges said battery power pack;
    a vehicle drive motor in electrical communication with both said electric generator and said battery power pack, wherein the generation of electrical energy by said electrical generator or through the discharge of said battery power pack is communicated to said vehicle drive motor and results in the rotation of a drive shaft of said vehicle drive motor;
    a drive motor controller in electrical communication with said vehicle drive motor in a manner providing selective control over rotation of said drive shaft of said vehicle drive motor;
    a wheeled vehicle having an engine compartment formed therein, wherein said motorized-generator power system is received within said engine compartment and is attached to said wheeled vehicle and wherein said wheeled vehicle has a plurality of wheels attached thereto; and
    a suspension system, said suspension system comprising:
        a plurality of wheel struts, each of said plurality of wheel struts attached to one of said plurality of wheels of said wheeled vehicle; and
        an extendable drive shaft attached to said vehicle and extending therefrom to at least one of said plurality of wheels of said wheeled vehicle,
    whereby operation of said suspension system enables the raising and lowering of said wheeled vehicle.

* * * * *